3,167,473
COMPOSITIONS CONTAINING BIOLOGICALLY ACTIVE POLYMERS OF ORGANOTIN ACID ESTER COMPOUNDS

John R. Leebrick, Roselle Park, N.J., assignor to M & T Chemicals Inc., New York, N.Y., a corporation of Delaware
No Drawing. Filed Jan. 3, 1963, Ser. No. 249,117
23 Claims. (Cl. 167—38.6)

This invention relates to novel biologically active polymeric materials. More specifically, it relates to novel biologically active compositions containing organotin polymers.

Organotin compounds, typified by trialkyl- and triarylorganotin compounds have found wide use as agents for controlling a broad spectrum of organisms. For example, they have been used to combat bacteria, fungi, mildew, marine fouling organisms, etc. However, their use has been attended by certain deficiencies. Typically, these compounds may possess high mammalian toxicity including vapor, oral, and dermal toxicity. They may also be highly phytotoxic. They may have a sharp, penetrating, disagreeable odor and a relatively high vapor pressure which affects their use in such areas as aerosol spray applications. They may also be relatively non-durable, i.e. they may readily be removed from a treated surface by rubbing, washing, solvent extraction, etc. Many of them may be liquids which may bloom or exude from a treated material, e.g. a paint, and form a surface film which can be transferred upon handling to human skin, thus causing skin irritation. They may have poor compatibility with paints, adhesives, and similar high molecular weight materials. Since many of them are mobile liquids, they may be uniformly distributed throughout the treated material, e.g. a foam. This is highly uneconomical, since normally protection may be required only at the surface of the material, and the agent dispersed within may be substantially wasted. Because of these limitations, organotin biological agents have not realized their fullest potential use.

It is an object of this invention to provide a novel method for treating materials to render them resistant to attack by a broad spectrum of organisms. It is a further object to provide novel biologically active agents. Other objects will become apparent to those skilled in the art upon reading the following description.

According to certain of its aspects, this invention relates to a method for protecting materials against attack by pesteriferous organisms which comprises treating said material with a biologically active polymer of a compound $R_3SnOOCR'$ wherein R is a radical selected from the group consisting of lower alkyl and phenyl, and R' is a polymerizable group selected from the group consisting of the vinyl, α-methylvinyl, and vinylphenyl radicals.

The materials which may be treated according to the process of this invention may be any of those materials known to be susceptible to attack by microorganisms. Illustrative of these are fibrous materials such as textiles, wood, etc.; plastics, including foamed plastics; paints, varnishes, adhesives, etc.; seeds, plants, tubers; leather; etc. It may also prove advantageous to treat materials which are not themselves subject to attack by organisms but upon which organisms may grow. Typically, these may include concrete surfaces which are exposed to sea water, metal or vitreous surfaces in contact with process waters, etc. It is a particular feature of this invention that porous materials, e.g. foams may be economically treated. For example, a solution or other composition containing the biologically active polymer may be applied to the surface of the porous material. It may then be found that the biologically active polymer will durably be retained on the surface of the porous material. This may be highly desirable, since protection may normally be required only at the surface of said material, and any biocide which is distributed throughout the interior portions may be substantially wasted. The treatment of plants, seeds, tubers, marine surfaces, and paints in accordance with this invention may permit attainment of desirable advantages. It is a particular feature of this invention that the treated material may be rendered resistant to attack by a broad spectrum of pestiferous organisms. Typically these organisms may include fungi, bacteria, molds, slimes, mildew, and marine organisms such as algae, barnacles, limnoria, toredo, tubeworms, hydroids, bryozoans, etc.

The biologically active polymers which may be employed in the practice of this invention may be polymers of a compound $R_3SnOOCR'$ wherein R may be a lower alkyl or phenyl radical, and R' may be a polymerizable radical selected from the group consisting of the vinyl, α-methylvinyl, and vinylphenyl radicals. The biologically active polymers may generally fall within the category of addition or vinyl polymers, i.e. they may be formed by polymerization of the respective monomers through an active double bond contained therein. Typically, such polymerization may be a free-radical polymerization.

According to certain specific aspects of this invention, the radical R may be a lower alkyl radical. Lower alkyl radicals may be those containing less than about ten carbon atoms and may include the ethyl, n-propyl, isopropyl, n-butyl, sec-butyl, tert-butyl, n-butyl, amyl, hexyl, octyl, nonyl, isooctyl, etc. radicals and cyclized lower alkyl radicals such as the cyclohexyl radical. R may also be an inertly substituted lower alkyl radical. Inert substituents may include chloride, bromide, ether, alkenyl, aryl, etc. substituents. When R is an alkyl radical of 2–4 carbon atoms, e.g. an ethyl, propyl, or butyl radical, the greatest activity may be obtained. All the R radicals need not be the same. It is preferred that when R is an alkyl radical the total number of carbon atoms in the three R radicals be in the range of 6–12 and most preferably 9–12.

According to certain other aspects of this invention, the radical R may be a phenyl radical, including inertly substituted phenyl radicals. Inert substituents may include chloride, bromide, ether, alkyl, etc. substituents and R may typically be chlorophenyl, bromophenyl, nitrophenyl, tolyl, xylyl, ethylphenyl, etc. Preferably, when R is a phenyl radical, including inertly substituted phenyl radicals, each R group may contain 6–10 carbon atoms and most preferably R may be an unsubstituted phenyl radical.

The radical R' may typically be a polymerizable radical selected from the group consisting of the vinyl, α-methylvinyl, and vinylphenyl radicals.

The radical R' may be a vinyl radical, and the compound $R_3SnOOCR'$ may be a triorganotin ester of acrylic acid i.e. a triorganotin acrylate. Typical triorganotin acrylates suitable for use in this invention may include tri-n-butyltin acrylate, tri-n-propyltin acrylate, tri-isopropyltin acrylate, tri-sec-butyltin acrylate, triethyltin acrylate, tribenzyltin acrylate, diethylbutyltin acrylate, diethylamyltin acrylate, diamylmethyltin acrylate, triphenyltin acrylate, diethylhexyltin acrylate, propylbutylphenyltin acrylate, tritolyltin acrylate, tribromophenyltin amyltin acrylate, diphenyltolyltin acrylate, tri(p-ethylphenyl)tin acrylate, diethylphenyltin acrylate, ethyldiphenyltin acrylate, n-octyldiphenyltin acrylate, diethyl-p-bromophenyltin acrylate, diethyloctyltin acrylate, etc.

According to certain other aspects of this invention the radical R' may be an α-methylvinyl radical, and $R_3SnOOCR'$ may be a triorganotin ester of methacrylic acid, i.e. a triorganotin methacrylate. Typical triorganotin methacrylates suitable for use in this invention may include tri-n-butyltin methacrylate,
tri-n-propyltin methacrylate,
tri-isopropyltin methacrylate,
tri-sec-butyltin methacrylate,
triethyltin methacrylate,
diethylbutyltin methacrylate,
diethylamyltin methacrylate,
diamylmethyltin methacrylate,
propylbutylamyltin methacrylate,
diethylhexyltin methacrylate,
triphenyltin methacrylate,
tritolyltin methacrylate,
tribromophenyltin methacrylate,
diphenyltolyltin methacrylate,
tri(p-ethylphenyl)tin methacrylate,
diethylphenyltin methacrylate,
ethyldiphenyltin methacrylate,
n-octyldiphenyltin methacrylate,
diethyl-p-bromophenyltin methacrylate,
diethyloctyltin methacrylate, etc.

According to certain other aspects of this invention, the radical R' may be a vinylphenyl radical, and $R_3SnOOCR'$ may be a triorganotin ester of vinylbenzoic acid, i.e. a triorganotin vinylbenzoate. Typical triorganotin vinylbenzoates include tri-n-butyltin p-vinylbenzoate,
tri-n-propyltin p-vinylbenzoate,
tri-isopropyltin p-vinylbenzoate,
tri-sec-butyltin m-vinylbenzoate,
triethyltin o-vinylbenzoate,
diethylbutyltin p-vinylbenzoate,
diethylamyltin m-vinylbenzoate,
diamylmethyltin p-vinylbenzoate,
propylbutylamyltin p-vinylbenzoate,
diethylhexyltin o-vinylbenzoate,
triphenyltin p-vinylbenzoate,
tritolyltin p-vinylbenzoate,
tribromophenyltin p-vinylbenzoate,
diphenyltolyltin p-vinylbenzoate,
tri(p-ethylphenyl)tin p-vinylbenzoate,
diethylphenyltin p-vinylbenzoate,
ethyldiphenyltin p-vinylbenzoate.
n-octyldiphenyltin p-vinylbenzoate,
diethyl-p-bromophenyltin p-vinylbenzoate,
diethyloctyltin p-vinylbenzoate, etc.

The preferred $R_3SnOOCR'$ compounds include tri-n-butyltin p-vinylbenzoate, tri-n-butyltin methacrylate, tri-n-propyltin methacrylate, triphenyltin methacrylate, and tri-n-propyltin p-vinylbenzoate.

These monomeric compounds may be available or they may if desired be readily synthesized in the laboratory by any of the known techniques for preparing organotin esters. For example they may be synthesized by the reaction of e.g. triphenyltin hydroxide with methacrylic acid. This may be effected for example by reaction of these materials in solvent e.g. benzene by heating the reaction mixture to azeotropically distill the by-product water. The desired product, commonly recovered by evaporating the solvent, may be readily obtained in substantially pure form in high yield.

In the practice of this invention, materials may be treated with a biologically active polymer of the compound $R_3SnOOCR'$. These polymers may typically be homopolymers of the compound $R_3SnOOCR'$, copolymers of $R_3SnOOCR'$ with other ethylenically unsaturated monomers, and copolymers of two or more $R_3SnOOCR'$ compounds. Thus, the biologically active polymer may be a homopolymer of, e.g. tri-n-butyltin acrylate, tri-n-propyltin methacrylate, triphenyltin acrylate, tri-n-butyltin methacrylate, tri-n-propyltin p-vinylbenzoate, triphenyltin methacrylate, tritolyltin acrylate, tri-isopropyltin p-vinylbenzoate, diethylamyltin acrylate, tri-n-propyltin acrylate, tri-n-butyltin p-vinylbenzoate, dimethyloctyltin methacrylate, diphenylethyltin p-vinylbenzoate, diethylphenyltin acrylate, etc.

The biologically active polymer may also be a copolymer of a compound $R_3SnOOCR'$ and an ethylenically unsaturated comonomer. Ethylenically unsaturated comonomers are compounds which contain polymerizable ethylenically unsaturated carbon-to-carbon double bonds. Such comonomers may include vinyl monomers such as vinyl chloride, styrene, p-chlorostyrene, vinyl acetate, vinyl butyrate, etc. They may also include acrylic monomers such as methyl acrylate, methyl methacrylate, ethyl acrylate, acrylic acid, methacrylamide, methacrylic acid, acrylamide, acrylonitrile, etc. They may also include other ethylenically unsaturated comonomers such as maleic acid, maleic anhydride, organo-metallic monomers, e.g. phenyl mercury methacrylate, di-n-butyltin bis(methacrylate), etc.

It may also be possible to employ copolymers of two or more of the $R_3SnOOCR'$ compounds. Typically, these copolymers may include tri-n-propyltin methacrylate-tri-n-butyltin methacrylate copolymers, tri-n-butyltin acrylate-triphenyltin acrylate copolymers, tri-n-butyltin p-vinylbenzoate-tri-isopropyltin p-vinylbenzoate copolymers, etc.

These biologically active polymers may be prepared by various techniques of free radical polymerization. Thus, the polymerizations may be carried out in bulk, in solution, in emulsion, in suspension, etc. Polymerization may be initiated by various suitable free radical initiators including benzoyl peroxide, di-t-butyl peroxide, lauroyl peroxide, cumene hydroperoxide, azo-bis-isobutyronitrile, methyl ethyl ketone peroxide, persulfate-bisulfite redox catalysts, persulfate-mercaptan redox catalysts and the like. The polymerizations may be carried out at any suitable temperature, depending upon the catalyst system employed, but temperatures in the range of 40–90° C. are preferred. Polymerization temperatures in this range afford a good balance among rate of polymerization, yield of polymer, molecular weight of polymer and time of reaction. Various polymerization control agents such as accelerators, chain-transfer agents, surface active agents, suspending agents and the like may also be employed if desired.

According to one preferred aspect of this invention, biologically active polymer may be applied to the material to be treated in the form of a composition containing an inert diluent. The inert diluent may be an inert solvent such as benzene, toluene, naphtha, mineral spirits, ligroin, etc. The inert diluent may also be a liquid dispersant which is not a solvent for the polymer, e.g. water. Other suitable inert diluents may include solid diluents or carriers such as talc, limestone, diatomaceous earth, etc. Other preferred inert diluents may be oil-based or water-based paints. If desired, the biologically active polymer may replace part or all of the binder in paints wherein it is employed.

Where the biologically active polymer is employed in a composition containing an inert diluent, the biologically active polymer may typically comprise 0.01% to 50% of the total composition. Preferably, it may comprise 0.2% to 20%, say 0.1% of the composition.

The particular composition employed and the amount of biologically active polymer contained therein may be chosen in accordance with the material treated and the organism against which protection is desired. According to certain preferred embodiments of this invention, the biologically active polymers may be employed as the active ingredient of anti-fouling coating compositions, including paints. Typically, anti-fouling paints may contain a paint base, including vinyl, acrylic and alkyd resin bases. They may also contain pigments such as titanium dioxide, thickeners such as bentonite; fillers such as aluminum silicate and calcium silicate; and driers such as cobalt naphthenate and manganese naphthenate; etc. They may normally contain solvents or thinners typified by mineral spirits, naphtha, benzene, toluene, methyl ethyl ketone, etc. When the biologically active polymers of this invention are employed in anti-fouling marine coating compositions, they may typically be employed in the amount of about 1–30% of the total composition. Preferably, they may constitute 5–12% say 10% of the total composition.

A specific anti-fouling paint prepared in accordance with this invention may have the following composition wherein all parts are parts by weight.

| | |
|---|---|
| Titanium dioxide | 19.4 |
| Aluminum silicate | 5.8 |
| Fibrous talc | 3.4 |
| High flash naphtha | 54.2 |
| Toluene | 18.2 |
| Poly(tri-propyltin methacrylate) | 15.3 |

In accordance with certain other preferred embodiments, the biologically active polymers of this invention may be used as the active ingredients of agricultural treatment compositions which may be employed in the treatment of plants, seeds, tubers, and the like. They are particularly useful in this respect because of their markedly and unexpectedly reduced phytotoxicity. The polymers of triphenyltin compounds (i.e. those wherein R is phenyl) possess particularly low phytotoxicity. Agricultural treating compositions may commonly be prepared in the form of dusting powders or wettable powders. They may typically contain adjuvants or carriers such as clay, diatomaceous earth, limestone, talc, etc. Dusting powders may be applied as such, while wettable powders may be dispersed in a liquid diluent, preferably water, before application. In accordance with this invention, the biologically active polymers may typically constitute about 1–60% of the agricultural treatment composition. Where the composition is a wettable powder, the biologically active polymer may typically be present in the amount of about 10–60% and preferably 15–40% of the composition. Wettable powders may be applied to plants by dispersing about 0.25–5 pounds of wettable powder in 100 gallons of water. Such dispersions may contain the biologically active polymer in a concentration of 0.005–0.25%, preferably 0.01–0.05% by weight. Plants may be treated with the dispersion by spraying at the rate of about 100–150 gallons of dispersion per acre.

A specific wettable powder formulation formulated in accordance with this invention may have the following composition wherein all parts are parts by weight.

| | |
|---|---|
| Poly(triphenyltin methacrylate) | 20.0 |
| Attapulgus clay [1] | 76.0 |
| Wetting agent [2] | 4.0 |

[1] Hydrous magnesium aluminum silicate.
[2] Made up of 2.0 parts of lignin sulfonate and 2.0 parts ethylene oxide nonyl phenol adduct containing 9 moles ethylene oxide per mole of phenol.

This wettable powder may be dispersed in water in the ratio of one pound of powder per 100 gallons of water and the resulting dispersion may be sprayed over 1 acre of plants.

Mildew and bacteria resistant paints containing the biologically active polymers may also be preferred compositions. These paints may be employed wherever the growth of organisms may be undesirable. For example, they may be used in hospitals, dairies, breweries and the like to control the growth of infectious organisms; on exterior wooden surfaces to prevent dry rot or mildew growth; etc. Typical mildew and bacteria resistant paints may be water-based paints, including those containing butadiene-styrene polymers, butadiene-acrylonitrile polymers, vinyl acetate polymers; oil-based paints including those containing alkyd polymers, natural varnishes, phenol-formaldehyde polymers; etc. Such paints may typically also contain pigments, thickeners, fillers, driers, solvents, thinners, etc. Mildew and bacteria resistant paints formulated in accordance with this invention may typically contain about 0.05–5.0% of biologically active polymer based on the weight of the total paint. Preferred mildew and bacteria resistant paints may contain about 0.1–1.0%, say 0.5% biologically active polymer.

A specified mildew and bacteria resistant paint formulated in accordance with this invention may have the following composition wherein all parts are parts by weight:

| | |
|---|---|
| Titanium dioxide | 26.2 |
| Calcium silicate | 4.4 |
| Calcium carbonate | 19.5 |
| Magnesium silicate | 8.2 |
| Isophthalic acid-menhaden oil alkyd | 11.6 |
| Blown menhaden oil | 3.9 |
| Cobalt naphthenate drier | 1.1 |
| Manganese naphthenate drier | 0.4 |
| Poly(tri-n-butyltin p-vinyl-benzoate) | 0.1 |
| Mineral spirits | 24.7 |

Another preferred biologically active composition based upon the novel biologically active polymers of this invention is an aerosol spray composition. Aerosol spray composition formulated in accordance with this invention may typically contain a solvent or diluent, a propellant, and as an active ingredient the biologically active polymers of this invention.

A typical formulation may contain about 10–30% by weight solvent, 69–89% by weight propellant and about 0.01–1.0% by weight biologically active polymer. A specific aerosol spray composition of this invention may be as follows wherein all parts are parts by weight:

| | |
|---|---|
| Poly(tri-n-propyltin methacrylate) | 0.1 |
| Toluene | 0.15 |
| Isopropanol | 15.0 |
| Propellant (dichlorodifluoromethane) | 84.75 |

Materials treated with any of the above compositions may be rendered resistant to attack by bacteria, fungi, mildew, mold, marine organisms, etc., for unexpectedly long periods of use.

The following examples illustrate the preparation of biologically active polymers which may be used in the practice of this invention.

EXAMPLE 1

A homopolymer of tri-n-propyltin methacrylate was prepared as follows:

| | Grams |
|---|---|
| Tri-n-propyltin methacrylate (monomer) | 291.6 |
| Surface active agent [1] | 21.9 |
| Lauryl mercaptan | 0.3 |
| Benzoyl peroxide | 0.8 |
| Carboxymethyl cellulose | 1.5 |
| Water | 500 |

[1] The ethylene oxide-nonyl phenol adduct sold under the trademark Igepal CO–610.

All of these materials were mixed together in a one liter flask. The mixture was slowly heated to a temperature of 100° C. and polymerization was carried out at reflux for a total of 6 hours. The product was a suspension of hard, granular, white, tin-containing polymer which was filtered off and washed with methanol until free of residual monomer. The yield was 259 grams.

EXAMPLE 2

A homopolymer of tri-n-propyltin methacrylate was prepared as follows:

| | Grams |
|---|---|
| Tri-n-propyltin methacrylate (monomer) | 75 |
| Surface active agent [1] | 5 |
| Potassium persulfate | 0.3 |
| Water | 180 |

[1] The ethylene oxide-nonyl phenol adduct sold under the trademark Tergitol NPX.

All of these materials were mixed together in a 500 cc. flask and the mixture was slowly heated to reflux (100° C.). The polymerization reaction was maintained at reflux for 4 hours. The suspension of polymer was filtered and washed with methanol to remove residual monomer. Analysis of the product poly(tri-n-propyltin methacrylate) showed a tin content of 33.13% (theory 35.6%).

EXAMPLE 3

A homopolymer of triphenyltin methacrylate was prepared in bulk by mixing 100 grams of triphenyltin methacrylate monomer and 0.3 gram of benzoyl peroxide and heating this mixture to 115° C.–120° C. for several hours. The product was a resinous poly(triphenyltin methacrylate) having a tin content of 29.93% (theory 2.75%).

EXAMPLE 4

A homopolymer of tri-n-butyltin p-vinylbenzoate was prepared as follows:

| | Grams |
|---|---|
| Tri-n-butyltin p-vinylbenzoate (monomer) | 110 |
| Surface active agent [1] | 5 |
| Lauryl mercaptan | 0.5 |
| Potassium persulfate | 0.3 |
| Water | 180 |

[1] The ethylene oxide-nonyl phenol adduct sold under the trademark Tergitol NPX.

All these materials were mixed together and polymerization was effected by maintaining the mixture at 90° C. for 9 hours. The resulting emulsion was poured into methanol, filtered, washed with methanol, and dried. The product was 96 grams of poly(tri-n-butyltin p-vinylbenzoate) containing 26.23% tin (theory 27.2%).

EXAMPLE 5

A homopolymer of tri-n-propyltin acrylate was prepared as follows:

| | Grams |
|---|---|
| Tri-n-propyltin acrylate (monomer) | 31.9 |
| Benzoyl peroxide | 0.2 |

These materials were mixed together and polymerized in bulk in a beaker for several hours at 120° C. A low molecular weight tacky tri-n-propyltin acrylate polymer was obtained.

EXAMPLE 6

A copolymer of tri-n-butyltin methacrylate and methyl methacrylate was prepared as follows:

| | Grams |
|---|---|
| Tri-n-butyltin methacrylate (monomer) | 75 |
| Methyl methacrylate | 25 |
| Surface active agent [1] | 5 |
| Lauryl mercaptan | 0.5 |
| Potassium persulfate | 0.3 |
| Water | 180 |

[1] The ethylene oxide-nonyl phenol adduct sold under the trademark Tergitol NPX.

These materials were mixed together and the mixture was heated to 95° C. and maintained at 95 to 100° C. for 4 hours. The product polymer suspension was filtered and washed with methanol. A rubbery, white, tin-containing copolymer was obtained. The yield of polymer was 85 grams.

EXAMPLE 7

The procedure of Example 6 was followed except that 50 grams of tri-n-butyltin methacrylate and 50 grams of methyl methacrylate were employed instead of the quantities of these materials used in Example 6. After 5½ hours at reflux, a rubbery, white, tin-containing polymer was obtained.

EXAMPLE 8

A copolymer of tri-n-butyltin methacrylate and di-n-butyltin dimethacrylate was prepared as follows:

| | Grams |
|---|---|
| Tri-n-butyltin methacrylate (monomer) | 95 |
| Di-n-butyltin dimethacrylate (monomer) | 5 |
| Surface active agent [1] | 7.5 |
| Lauryl mercaptan | 0.1 |
| Benzoyl peroxide | 0.4 |
| Carboxymethyl cellulose | 0.5 |
| Water | 180 |

[1] The ethylene oxide-nonyl phenol adduct sold under the trademark Igepal CO-610.

The materials were mixed together and the mixture was heated to 80° C. and maintained at 80° C. for 3 hours. After filtration and washing with methanol, the product polymer weighed 100 grams.

The following examples illustrate the novel biological activity of the polymers of this invention.

EXAMPLE 9

The noted polymers were tested against bacteria according to the Agar Diffusion method. In this test a nutrient agar medium may be melted and inoculated with the desired organism. The seeded agar may then be placed in a petri dish and a 6 millimeter well cut from the center of the agar. The material to be tested may then be placed in this well and the dishes refrigerated at about 5° C. for 18 hours and incubated at 37° C. for 24 hours. The dishes may then be visually examined. Ratings of the activity of the tested material may be determined by measuring the distance from the edge of the well which remains free of bacterial growth. This distance, expressed in millimeters is an indication of the activity of the material tested. Zones of inhibition followed by the letter "c" are complete zones—i.e. they are completely free of growth. Zones of inhibition followed by the letter "p" are partial zones—i.e. zones wherein the growth of the organism has been significantly hindered but not completely inhibited. A reading of 8c means that, for a distance of 8 mm. from the edge of the well, there was complete inhibition.

The results of this test employing several of the biologically active polymers are set forth in Table I wherein the ratings are the zones of inhibition for the organism noted. The polymers tested are designated by the symbols noted.

| | Material |
|---|---|
| A | Copolymer of tributyltin methacrylate-methyl methacrylate (1:1). |
| B | Poly(tributyltin methacrylate). |
| C | Poly(tributyltin p-vinylbenzoate). |
| D | Copolymer of tributyltin methacrylate-phenylmercury methacrylate (9:1). |
| E | Poly(triisopropyltin p-vinylbenzoate). |
| F | Poly(tri-n-propyltin methacrylate). |
| G | Poly(tri-n-propyltin acrylate). |

*Table I*

| Material Tested | Staphylococcus aureus | Aerobacter aerogenes | Pseudomonas aeruginosa |
|---|---|---|---|
| A | 8c | 2p | 3.5c |
| B | 10c | 1p | 4c |
| C | 15c | 2c | 3c |
| D | 8c | 5c | 5c |
| E | 15c | 2c | 3c |
| F | 10c | 10c | 6c |
| G | 5c | 3.5c | 1c |

From this example, it may readily be seen that the novel biologically active polymers of this invention possess highly satisfactory activity against common bacteria.

EXAMPLE 10

The materials noted in Example 9 were tested against fungi by the Agar Diffusion test described in Example 9. The only change in the procedure was that the dishes were incubated for 5 days at 28–30° C. before inspection. The results of these evaluations are tabulated in Table II wherein the rating system is the same as in Example 9.

*Table II*

| Material Tested | Aspergillus niger | Penicillium funiculosum |
|---|---|---|
| A | 6c | 5c |
| B | 7c | 4c |
| C | 9c | 8c |
| D | 15c | 21c |
| E | 40c | 35c |
| F | 40c | 30c |
| G | 27c | 18c |

From inspection of this table, it may readily be seen that the biologically active polymers of this invention are highly satisfactory fungicides.

EXAMPLE 11

This example illustrates the use of the novel biologically active polymers of this invention as anti-fouling agents. Pine panels measuring 1" x 6" x 12" were sprayed with 10% by weight solutions in toluene of (a) a copolymer of tri-n-butyltin methacrylate and methyl methacrylate (1:1); (b) a copolymer of tri-n-butyltin methacrylate and methyl methacrylate (3:1); and (c) a 3.75% solution of poly (tri-n-butyltin p-vinylbenzoate). The test panels and an untreated control were immersed below tide level in the sea at Miami Beach, Florida. This area is known to contain a prolific number of fouling organisms and thus provides an exceptionally strenuous test. It was found that the untreated control was completely fouled within one month whereas all the panels treated in accordance with this invention remained substantially free of fouling after 6 months. At the end of one year, all the treated panels still exhibited at least some degree of control. The anti-fouling performance of the biologically active polymers is unexpectedly superior to prior art agents which may lose their activity after a few months or less. It is a further advantage of this invention that the polymeric anti-fouling agents need not be applied as a component of a paint. As is shown in this example, they have unexpectedly high durability even when applied alone.

EXAMPLE 12

It is a particular feature of the biologically active polymers that they are characterized by their markedly reduced phytotoxicity. While this is true of all of them, it is an especially noteworthy property of the triphenyltin polymers. Even the most widely used prior art organotin fungicides are phytotoxic to at least some degree and have, therefore, not been used to their fullest potential. This example illustrates the unexpectedly reduced phytotoxicity of the novel biologically active polymers of this invention.

Separate sections of field of potatoes (Avon and Katahdin varieties) were treated with triphenyltin acetate, triphenyltin hydroxide, bis(triphenyltin) oxide, bis(triphenyltin) sulfide, and poly(triphenyltin) methacrylate. Treatments were made at the rate of 0.3 pound of active ingredient per 100 gallons of water per acre. Eight days after the treatment all the plants were inspected. Results are shown in Table III.

*Table III*

| Active Ingredient | Remarks |
|---|---|
| Triphenyltin acetate (standard) | A few small black dots on underside of lower leaves and petioles. Many buds abscissed, few open. |
| Triphenyltin hydroxide (standard) | Many black dots on upper and lower sides or most leaves and many petioles. New top growth slightly bronzed. Some buds burned at tip, many abscissed. Plants were smaller than control, no plants in bloom. |
| Bis(triphenyltin) oxide (standard) | Many black dots on upper and lower sides of most leaves and many petioles. No plants in bloom. |
| Bis(triphenyltin) sulfide (standard) | A few black dots on underside of a few leaves and petioles. Most buds abscissed, no plants in bloom. |
| Poly(triphenyltin methacrylate) (this invention) | No injury to leaves or petioles. Numerous buds open in full bloom. |

From an inspection of the above results it may be seen that the biologically active polymers of this invention are particularly characterized by their unexpectedly reduced phytotoxicity, in which respect they are greatly superior to the most widely accepted organotin agricultural fungicides. As many embodiments of this invention may be made without departing from the spirit and scope thereof, it is to be understood that the invention includes all such modifications as come within the scope of the appended claims. This application is a continuation-in-part application of application Serial No. 33,943, filed June 6, 1960, for Chemical Product and Process, by the same inventor, John R. Leebrick.

I claim:

1. The process for protecting materials against growth of pestiferous organisms which comprises treating said material with a biologically active polymer of a compound $R_3SnOOCR'$ wherein R is a radical selected from the group consisting of lower alkyl and phenyl, and R' is a polymerizable group selected from the group consisting of the vinyl, α-methylvinyl, and vinylphenyl radicals.

2. The process for protecting materials against growth of pestiferous organisms as claimed in claim 1 wherein R is butyl.

3. The process for protecting materials against growth of pestiferous organisms as claimed in claim 1 wherein R is propyl.

4. The process for protecting materials against growth of pestiferous organisms as claimed in claim 1 wherein R is phenyl.

5. The process for protecting marine surfaces against the growth of fouling organisms which comprises treating said marine surface with a composition containing 1–30% by weight of a biologically active polymer of a compound $R_3SnOOCR'$ where R is a radical selected from the group consisting of lower alkyl and phenyl, and R' is a polymerizable group selected from the group consisting of the vinyl, α-methylvinyl, and vinylphenyl radicals.

6. The process for protecting marine surfaces as claimed in claim 5 wherein R is butyl.

7. The process for protecting marine surfaces as claimed in claim 5 wherein R is propyl.

8. The process for protecting marine surfaces as claimed in claim 5 wherein R is phenyl.

9. An antifouling marine coating composition comprising a paint base and 1–30% by weight based on the weight of the total composition of a biologically active polymer of a compound $R_3SnOOCR'$ wherein R is a radical selected from the group consisting of lower alkyl and phenyl, and R' is a polymerizable group selected from the group consisting of the vinyl, α-methylvinyl, and vinylphenyl radicals.

10. An anti-fouling marine coating composition as claimed in claim 9 wherein R is butyl.

11. An anti-fouling marine coating composition as claimed in claim 9 wherein R is propyl.

12. The process for protecting plants against attack by fungi which comprises treating said plants with a composition containing 0.005–0.25% by weight of a biologically active polymer of a compound $R_3SnOOCR'$, wherein R is a radical selected from the group consisting of lower alkyl and phenyl, and R' is a polymerizable group selected from the group consisting of the vinyl, α-methylvinyl, and vinylphenyl radicals.

13. The process for protecting plants as claimed in claim 12 wherein R is phenyl.

14. An agricultural treatment composition comprising an inert diluent and 1–60% by weight based on the weight of the total composition of a biologically active polymer of a compound $R_3SnOOCR'$ wherein R is a radical selected from the group consisting of lower alkyl and phenyl and R' is a polymerizable group selected from the group consisting of the vinyl, α-methylvinyl, and vinylphenyl radicals.

15. An agricultural treatment composition as claimed in claim 14 wherein R is phenyl.

16. The process for protecting paints against growth of pestiferous organisms which comprises incorporating in said paint 0.05–5.0% by weight of a biologically active polymer of a compound $R_3SnOOCR'$ wherein R is a radical selected from the group consisting of lower alkyl and phenyl, and R' is a polymerizable group selected from the group consisting of the vinyl, α-methylvinyl, and vinylphenyl radicals.

17. The process for protecting paint as claimed in claim 16 wherein R is butyl.

18. The process for protecting paint as claimed in claim 16 wherein R is propyl.

19. The process for protecting paint as claimed in claim 16 wherein R is phenyl.

20. A mildew- and bacteria-resistant paint comprising a paint base and 0.05–5.0% by weight based on the weight of the total paint of a biologically active polymer of a compound $R_3SnOOCR'$ wherein R is a radical selected from the group consisting of lower alkyl and phenyl, and R' is a polymerizable group selected from the group consisting of the vinyl, α-methylvinyl, and vinylphenyl radicals.

21. A mildew and bacteria resistant paint as claimed in claim 20 wherein R is butyl.

22. A mildew and bacteria resistant paint as claimed in claim 20 wherein R is propyl.

23. A mildew and bacteria resistant paint as claimed in claim 20 wherein R is phenyl.

References Cited in the file of this patent

UNITED STATES PATENTS

| | | |
|---|---|---|
| 2,344,002 | Rugeley et al. | Mar. 14, 1944 |
| 2,598,496 | Bradley et al. | May 27, 1952 |
| 2,873,288 | Rosenberg et al. | Feb. 10, 1959 |
| 3,097,999 | Koopmans | July 16, 1963 |

OTHER REFERENCES

Andrews et al.: JACS, 80 (1958), p. 4102–4.
Fisher: J. of Chem. Education, 37 (1960), p. 375.